Patented Nov. 4, 1941

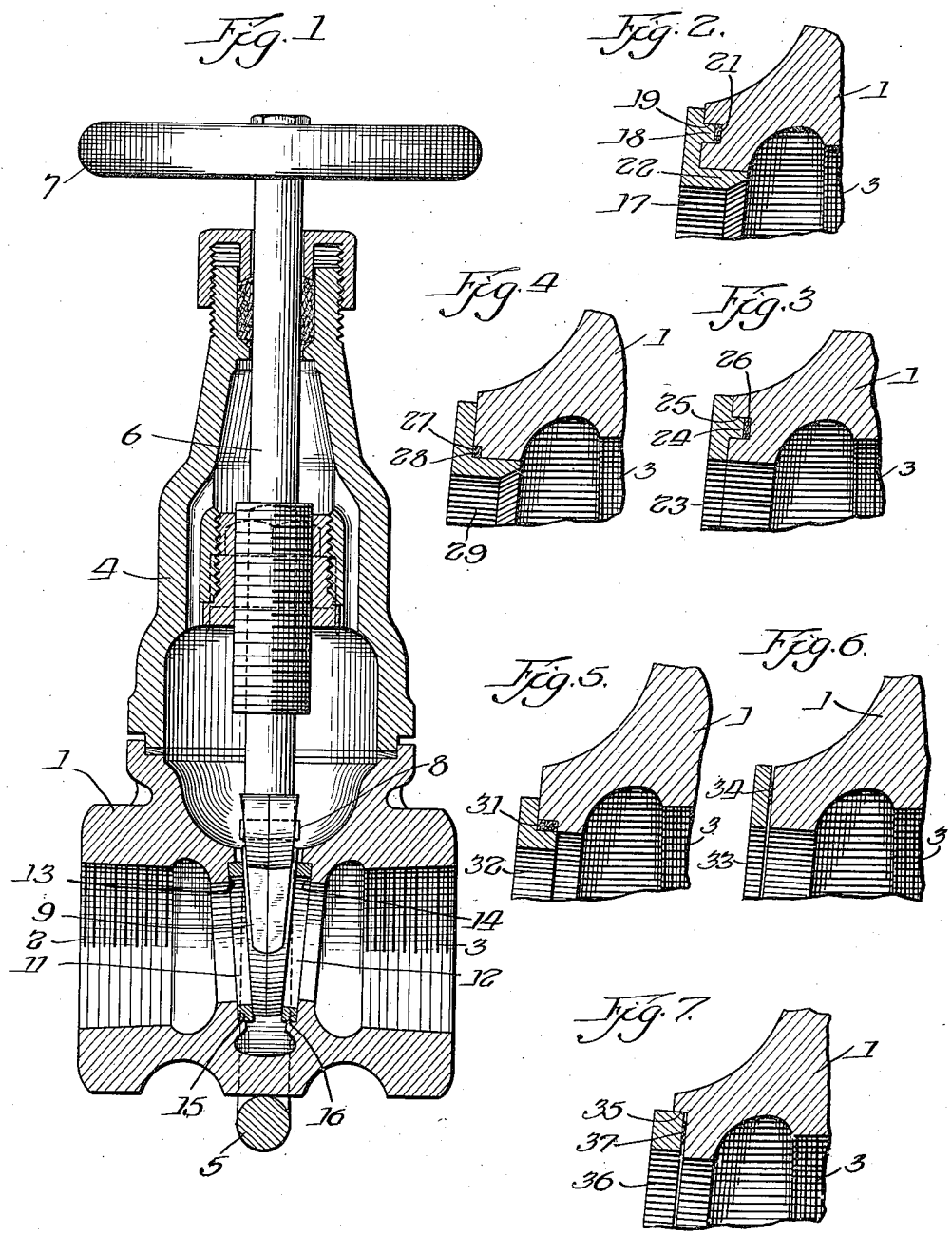

2,261,489

UNITED STATES PATENT OFFICE 2,261,489

METHOD OF MANUFACTURING VALVES

Frederick R. Venton, Clarendon Hills, Ill., assignor to Crane Co., Chicago, Ill., a corporation of Illinois Application May 1, 1940, Serial No. 332,679

4 Claims. (Cl. 29—157.1)

My invention relates to a method of manufacturing valves and is particularly directed to a simple, convenient and economical method of attaching renewable seats within the bodies of valves.

Heretofore, in the manufacture of valves, it has been customary to attach renewable seats to the valves either by means of screw-threads or by peening the renewable seats into recesses provided therefor. These seats, when used on service wherein the temperature of the pipeline fluctuates within a wide range of temperature, such as, for example, oil refinery and steam service, frequently become loose and thereby permit leakage through the valves.

The primary object of my invention lies in the provision of a method whereby renewable valve seats may be quickly and economically soldered or brazed into a valve thus substantially eliminating the possibilities of the seat becoming loose.

Another object is to provide a novel method of holding or maintaining the seats in their proper positions during the soldering or brazing operation thus materially reducing the subsequent machining operations required for truing or accurately aligning the seating surfaces.

A still further object is to provide a novel method of heating the seats and the soldering or brazing compound while the said seats are securely positioned in their proper places within the valve.

Other objects and advantages will appear from the following detailed descriptions which are to be taken in connection with the accompanying drawing, in which Fig. 1 is a vertical sectional view of a valve manufactured in accordance with the provisions of my invention.

Fig. 2 is a magnified fragmentary sectional view showing a modified construction of a brazed or soldered renewable seat.

Figs. 3, 4, 5, 6 and 7 are views similar to Fig. 2 in which still further modifications of the renewable brazed or soldered seats are shown.

Like reference numerals refer to like parts throughout the various views of the drawing.

Referring to Fig. 1, the valve which I have chosen for illustrative purposes in connection with my present invention is known to those skilled in the art as a clamp type gate valve having a solid wedge-shaped closure member. The valve comprises the usual parts consisting of a body or casing 1 having aligned ports or passages 2 and 3, a bonnet 4 secured to the body 1 by the U-shaped clamp 5, a stem 6 screw-threadedly mounted within the bonnet 4 and having a handwheel 7 attached to its uppermost end. The other end of the stem 6 is provided with a T head 8 for engagement with the wedge-shaped closure member or disc 9, the latter member being adapted to contact the renewable seats 11 and 12 (as shown) for the purpose of stopping fluid flow through the valve. By manual operation of the handwheel 7 the disc 9 may be lifted out of contact with the seats 11 and 12 and raised into the lower hollow portion of the bonnet 4 where it is in a fluid flow-permitting position.

As previously stated, my present invention appertains to a novel and convenient method of soldering or brazing the renewable seats 11 and 12 within the body 1 of the valve. Obviously, of course, the precise shape and configuration of the seat is not important, for example, the cross-section may be substantially square as shown in Fig. 1 wherein the solder may be positioned circumferentially in the corners at 13 and 14 prior to the application of heat and upon heating, the solder will be drawn into the recesses 15 and 16 by capillary attraction. Or, if desired, a wide variety of shapes of alternative renewable seat constructions may be employed, and in order to illustrate a few of the possible seat constructions Figs. 2 to 7 are provided to exemplify the preferred modifications thereof. In every instance I have found it expedient to utilize preformed solder inserts, however, the solder may be supplied to the joint in any convenient manner. Fig. 2 discloses a renewable seat 17 having a tongue 18 engaging a groove 19 in which a quantity of solder 21 has been provided, the seat further having a cylindrical portion 22 extending into the valve port. In Fig. 3 the seat 23 likewise is provided with a tongue 24 engaging the groove 25, the latter having been provided with the solder insert 26. Fig. 4 provides a circumferential groove 27 in the body 1 for the reception of the solder 28 whereby the seat 29 is permitted to assume its final position before the soldering operation is performed. Fig. 5 is a modification of the construction shown in the previous figure wherein, if desired, a ring of solder 31 may be pre-cast upon the seat 32 to facilitate assembly of the valve. Fig. 6 provides merely a plain ring-shaped seat 33 and a quantity of solder 34 interposed between the said seat and the body 1. Fig. 7 discloses a construction similar to the previous figure but modified to provide a recess 35 in the body to assist in the proper positioning of the seat 36 and the solder 37.

The manner in which I prefer to carry out the method of my invention comprises assembling the valve as it is shown in Fig. 1, or, if desired, any of the modified forms of seats may be provided, whereby the seats are securely maintained in substantially their final and proper positions, and with an appropriate quantity of solder provided. Thereafter, I prefer to insert electrical induction heating coils into the ports 2 and 3 of the valve so that the field of induced heating will be concentrated in the vicinity of the seats and the solder. Suitable application of electrically induced heat in this manner will cause the solder to melt and to flow by capillary attraction between all of the contacting surfaces of the seat and the body after which the heating may be stopped and the seats allowed to cool. Inasmuch as the seating surfaces of the seats and the closure member may be prepared before assembly of the valve, it is obvious that after the soldering operation little or no finishing of the surfaces need be done to provide a fluid tight valve.

Alternative constructions which may be utilized in place of the closure member for maintaining the seats in their proper places during the soldering operation are subject to wide variations. For example, if desired, the electrical induction heating coil may be formed in the shape of the closure member 9 and wedged between the seats, or, if desired, a special wedge similar to the closure member 9 may be formed with an aperture therethrough in axial alignment with the ports of the valve so that a single rod-like heating element may be positioned through the ports of the valve to provide for the heating of the seats and the solder. In either of these alternative methods it is obvious that the complete assembly of the valve may be dispensed with inasmuch as the member which holds the seats in place may be secured in its proper position by any suitable clamping means.

Having thus disclosed my invention it is to be clearly understood that the methods described herein may be applied to many types of valves wherein it is desired to secure renewable seats. Further, the scope of my invention is to be limited only by the claims appended hereto.

I claim:

1. The method of manufacturing a valve comprising forming a casing, a closure member and renewable seats therefor, positioning the said seats in the said casing in predetermined relation to the said closure member, holding the said seats by means of the said closure member against shouldered portions within the said casing, then heating and soldering the said shouldered portions and the said seats so as to hold the latter members fixedly and snugly within the said casing against the said shouldered portions.

2. In the method of manufacturing a valve comprising forming and assembling the parts of the valve including a casing, a closure member and renewable seats therefor, the said seats being initially loosely positioned within the said casing, longitudinally moving the closure member in abutting relation to the said loosely positioned seats, supplying a soldering composition to the contacting surfaces of the said seats with the said casing, and thereafter locally heating the said seats and the said casing adjacent to the soldering composition to solder the said seats to the said casing.

3. In the method of assembling a valve which comprises forming a casing, a closure member therefor, angularly formed renewable seats within the said casing, positioning the said seats loosely within the said casing and depositing a quantity of soldering composition between an angularly formed portion of the said seats and the said casing, holding the said seats tightly in their ultimately seated positions within the said casing, and thereafter locating the solder, the said closure member serving jointly as the gauge and the holding means for determining the said ultimate positions of the seats with relation to the said closure member and casing.

4. In the method of manufacturing a valve comprising forming and assembling the parts of the valve including a casing, a wedge-shaped closure member, renewable seats in juxtaposition thereto, the said seats being initially axially movable and maintained in substantially pressure tight relation with the said casing by the wedging action of the said closure member, supplying a soldering composition to the contacting surfaces of the said seats and the said casing, and thereafter heating the said seats and the said soldering composition to solder the said seats to the said casing while being held by the said closure member in said pressure tight relation.

FREDERICK R. VENTON.

CERTIFICATE OF CORRECTION.

Patent No. 2,261,489.

November 4, 1941.

FREDERICK R. VENTON.

It is hereby certified that error appears in the printed specification of the above numbered patent requiring correction as follows: Page 2, second column, line 33, for the word "locating" read --heating--; and that the said Letters Patent should be read with this correction therein that the same may conform to the record of the case in the Patent Office.

Signed and sealed this 16th day of December, A. D. 1941.

(Seal)

Henry Van Arsdale,
Acting Commissioner of Patents.